United States Patent
Tang

(10) Patent No.: US 11,256,382 B2
(45) Date of Patent: Feb. 22, 2022

(54) METHOD FOR DISPLAYING INTERACTIVE CONTENT, ELECTRONIC DEVICE, AND STORAGE MEDIUM

(71) Applicant: BEIJING DAJIA INTERNET INFORMATION TECHNOLOGY CO., LTD., Beijing (CN)

(72) Inventor: Xiao Tang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/881,696

(22) Filed: May 22, 2020

(65) Prior Publication Data

US 2020/0285351 A1 Sep. 10, 2020

(30) Foreign Application Priority Data

May 23, 2019 (CN) .......................... 201910433973.7

(51) Int. Cl.
| | | |
|---|---|---|
| *G06F 3/0481* | (2013.01) | |
| *G06F 9/451* | (2018.01) | |
| *G06F 11/34* | (2006.01) | |
| *G06T 13/00* | (2011.01) | |

(52) U.S. Cl.
CPC ............ *G06F 3/0481* (2013.01); *G06F 9/451* (2018.02); *G06F 11/3438* (2013.01); *G06T 13/00* (2013.01)

(58) Field of Classification Search
CPC .... G06F 3/0481; G06F 9/451; G06F 11/3438; G06T 13/00
See application file for complete search history.

(56) References Cited

U.S. PATENT DOCUMENTS

| | | | |
|---|---|---|---|
| 10,616,666 B1* | 4/2020 | Pontiff | G06T 11/203 |
| 2018/0267674 A1* | 9/2018 | Shavit | G06Q 30/0269 |
| 2019/0096113 A1* | 3/2019 | Stukalov | G06F 1/1694 |

FOREIGN PATENT DOCUMENTS

| | | |
|---|---|---|
| CN | 103425703 A | 12/2013 |
| CN | 105205101 A | 12/2015 |
| CN | 105335050 A | 2/2016 |

OTHER PUBLICATIONS

Asta Zelenkauskaite et al., User Interaction Profiling on Facebook-Twitter and Google+ across Radio Stations, Jan. 1, 2015, IEEE Computer Society, pp. 1657.-1666 (Year: 2015).*
S.J. Davis et al., Multimedia Adaptation Based On Semantics From Social Network Users Interacting With Media, Jun. 1, 2010, IEEE Xplore, pp. 170-175 (Year: 2010).*
TikTok—Using Like this Will Get More Referral Traffic, Oct. 31, 2018.

* cited by examiner

*Primary Examiner* — Tam T Tran
(74) *Attorney, Agent, or Firm* — Meunier Carlin & Curfman LLC

(57) ABSTRACT

The present disclosure relates to a method for displaying interactive content, electronic device, storage medium and computer program product. The method includes: receiving user operation instruction for a created content; analyzing the user operation instruction; determining interactive content corresponding to the user operation instruction; and displaying the interactive content, where the interactive content is used for indicating preference level of a user to the created content.

9 Claims, 6 Drawing Sheets

---

Receiving a user operation instruction for created content — S101

↓

Analyzing the received user operation instruction, and determining interactive content corresponding to the user operation instruction — S102

↓

Displaying the interactive content — S103

METHOD FOR DISPLAYING INTERACTIVE CONTENT, ELECTRONIC DEVICE, AND STORAGE MEDIUM

CROSS REFERENCE TO RELATED APPLICATION

This application claims priority to Chinese Patent Application No. 201910433973.7, filed with the Chinese Patent Office on May 23, 2019. The entire disclosure of the above application is incorporated herein by reference.

FIELD

The present disclosure relates to the technical field of computers and in particular to a method for displaying interactive content and device.

BACKGROUND

With the high-speed development of a mobile internet technology, more and more people share created contents by virtue of a mobile terminal. For example, people share videos. Accordingly, many video playback applications based on recommendation appear.

In the related art, when users watch a video, in order to realize the interaction among the users with respect to the video, for example, a function of "like" is generally set at the terminal side to allow users to know the video is liked by a certain user, so as to realize the interaction among the users by displaying the mark of "like". That is, when a certain user presses the "like" icon for the video, other users may see the displayed mark of "like" for the video.

However, by the interactive content display manner in the related art, users only know that the video is popular. Therefore, there is a problem of monotonous interactive content display in related art which results in poor user experience.

SUMMARY

The present disclosure provides a method for displaying interactive content and device.

In some embodiments, a method for displaying interactive content is provided. The method includes: receiving a user operation instruction for created content; analyzing the user operation instruction; determining interactive content corresponding to the user operation instruction; and displaying the interactive content, where the interactive contents is used for indicating a preference level of a user to the created content.

In some embodiments, an electronic device is provided. The electronic device includes: a processor; and a memory configured to store processor executable instructions; wherein the processor is configured to execute the instructions to perform: receiving a user operation instruction for created content; analyzing the user operation instruction; determining interactive content corresponding to the user operation instruction; and displaying the interactive content, where the interactive contents is used for indicating a preference level of a user to the created content.

In some embodiments, a storage medium is provided. The storage medium stores instructions executable by processors of an electronic device. When executed by the processors, the instructions causes the electronic device to perform: receiving a user operation instruction for created content; analyzing the user operation instruction; determining interactive content corresponding to the user operation instruction; and displaying the interactive content, where the interactive contents is used for indicating a preference level of a user to the created content.

In some embodiments, a computer program product is provided. When executed by a computer, the computer program product causes the computer to execute the method for displaying interactive content provided by some embodiments of the present disclosure.

It should be understood that the above general description and the hereafter detailed description are only exemplary and explanatory, but may not limit the present disclosure.

BRIEF DESCRIPTION OF THE DRAWINGS

Accompanying drawings described herein are incorporated into the specification to construct one part of the specification, show embodiments conforming to the present disclosure and are intended to explain the principle of the present disclosure together with the specification.

DETAILED DESCRIPTION OF THE EMBODIMENTS

In order to make those of ordinary skill in the art better understand the technical solutions of the present disclosure, the technical solutions in the embodiments of the present disclosure will be clearly and completely described in combination with the accompanying drawings.

It should be noted that terms such as "first" and "second" in the specification and claims of the present disclosure and the above-mentioned accompanying drawings are intended to distinguish similar objects, rather than to describe a specific order or a precedence order. It should be understood that data used in such a way may be exchanged under an appropriate condition so that the embodiments of the present disclosure described herein may be executed in an order except those orders illustrated or described herein. Implementation modes in the following exemplary embodiments do not represent for all the implementation modes consistent with the present disclosure. On the contrary, they are only examples of a device and a method consistent with some aspects of the present disclosure and described in detail in the appended claims.

Embodiment 1

Figure 1:
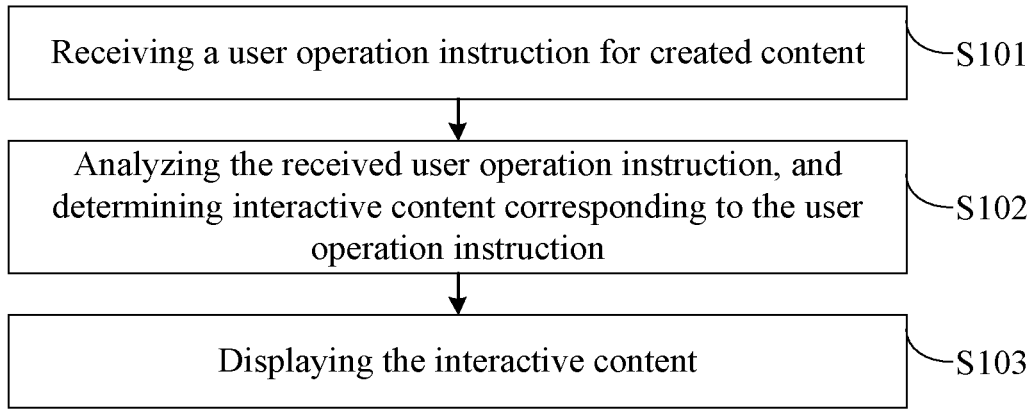
FIG. 1 is a flow chart of a method for displaying interactive content shown according to an exemplary embodiment.

FIG. 1 is a flow chart of a method for displaying interactive content shown according to an exemplary embodiment. As shown in FIG. 1, the method for displaying interactive content is used in a terminal. In some embodiments, the terminal may be a portable computer, an intelligent mobile terminal and the like. The method for displaying interactive content includes the following steps.

S101, receiving a user operation instruction for created content.

In some embodiments, the created content may refer to a content uploaded and shared by a user. The created content can be in the form of text, audio, video and the like. Accordingly, the created content can be a passage, a song and a video. The above-mentioned video may be a video played in a video playback application of the terminal, such as a video created by a user, a video shared by a user and a video generated during live broadcast by a host. It is easy to understand that the user may send different operation instructions for the above-mentioned created contents, and the operation instructions may include, but are not limited to a double-click video operation instruction, a long-time pressing operation instruction, a continuous-click operation instruction, a single-click operation instruction and the like.

In some embodiments, a screen may be continuously clicked twice on a playing picture of the terminal when the user watches the video to send the double-click operation instruction, and accordingly, the terminal may receive the double-click operation instruction.

In some embodiments, the user may press the screen for a long time on the playing picture of the terminal. In some embodiments, the screen is pressed for 2-3 seconds to send the long-time pressing operation instruction, and accordingly, the terminal may receive the long-time pressing operation instruction.

Of course, the user may also perform an operation on a preview picture of the created content to generate an operation instruction, and accordingly, the terminal may also receive the user operation instruction.

S102, analyzing the user operation instruction, and determining interactive content corresponding to the user operation instruction.

In some embodiments, a correspondence between a preset operation instruction and the interactive content may be preset in advance. Accordingly, the interactive content can be determined according to the correspondence and the user operation instruction. In some embodiments, the above-mentioned correspondence may be set by a technician according to an actual service requirement, and is not specifically limited in some embodiments.

S103, displaying the interactive content.

After the terminal determines the interactive content corresponding to the user operation instruction, different interactive contents may be displayed for the created content, the interactive content may be used for indicating acceptance and preferences of users to the created content. In some embodiments, the interactive content is used for indicating a preference level of a user to the created content, and different interactive contents indicate different preference levels.

In some embodiments, when the displayed interactive content is a first appreciation sign, it shows that the user accept the created content, but the preference level is mild; and when the displayed interactive content is a second appreciation sign, it shows that the user not only accept the created content, but also likes the created content very much. The above-mentioned first appreciation sign may be, in some embodiments, a common thumb-up icon, and the above-mentioned second appreciation sign may be a bomb-shaped appreciation sign, namely liking in a degree similar to a super bomb, and may present with a dynamic effect.

According to the method for displaying interactive content provided by the embodiment of the present disclosure, after the user operation instruction for the created content is received, the user operation instruction is analyzed, and the interactive content corresponding to the user operation instruction is determined, so that the determined interactive content is displayed; and since different interactive contents indicate different preference levels of users to the created content, the interactive content may be displayed in a richer display way, so that the user experience is improved.

Embodiment 2

Figure 2:
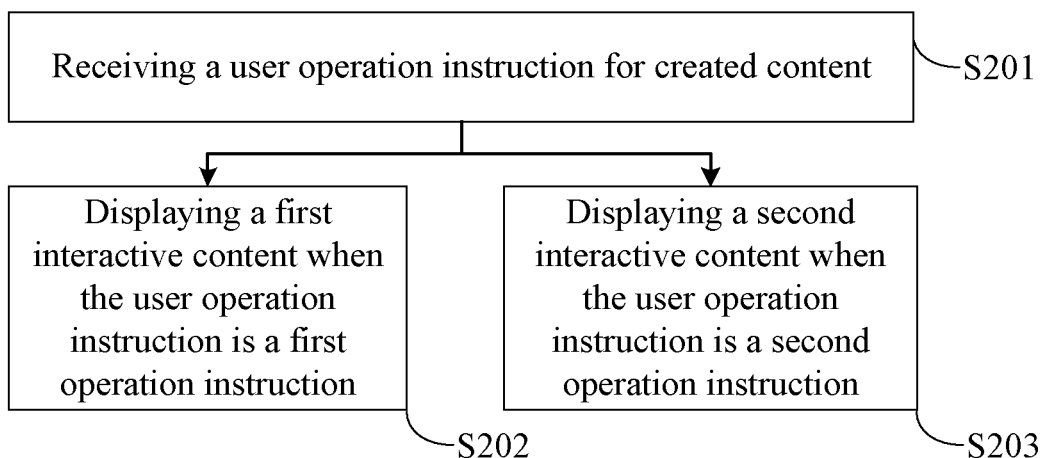
FIG. 2 is a flow chart of another method for displaying interactive content shown according to an exemplary embodiment.

FIG. 2 is a flow chart of another method for displaying interactive content shown according to an exemplary embodiment. As shown in FIG. 2, the method for displaying interactive content is used in a terminal. In some embodiments, the terminal may be a portable computer, an intelligent mobile terminal and the like. The method for displaying interactive content includes the following steps.

S201, receiving a user operation instruction for created content.

The step is same as step S101 in embodiment 1, the descriptions thereof are omitted in some embodiments.

S202, displaying first interactive content when the user operation instruction is a first operation instruction.

In some embodiments, when the user operation instruction is the first operation instruction, the first interactive content may be displayed, wherein the first operation instruction may be a double-click operation instruction. In some embodiments, a first appreciation sign is displayed.

S203, displaying a second interactive content when the user operation instruction is a second operation instruction.

When the user operation instruction is the second operation instruction, the second interactive content may be displayed, wherein the second operation instruction may be a long-time pressing operation instruction. In some embodiments, a second appreciation sign is displayed. Here the user preference level indicated by the second interactive content is higher than that indicated by the first interactive content.

Of course, a technician may preset a correspondence between the user operation instruction and the interactive content and makes changes according to an actual service requirement as long as it may ensure that different interactive contents are correspondingly displayed when the terminal receives different user operation instructions.

Figure 3:
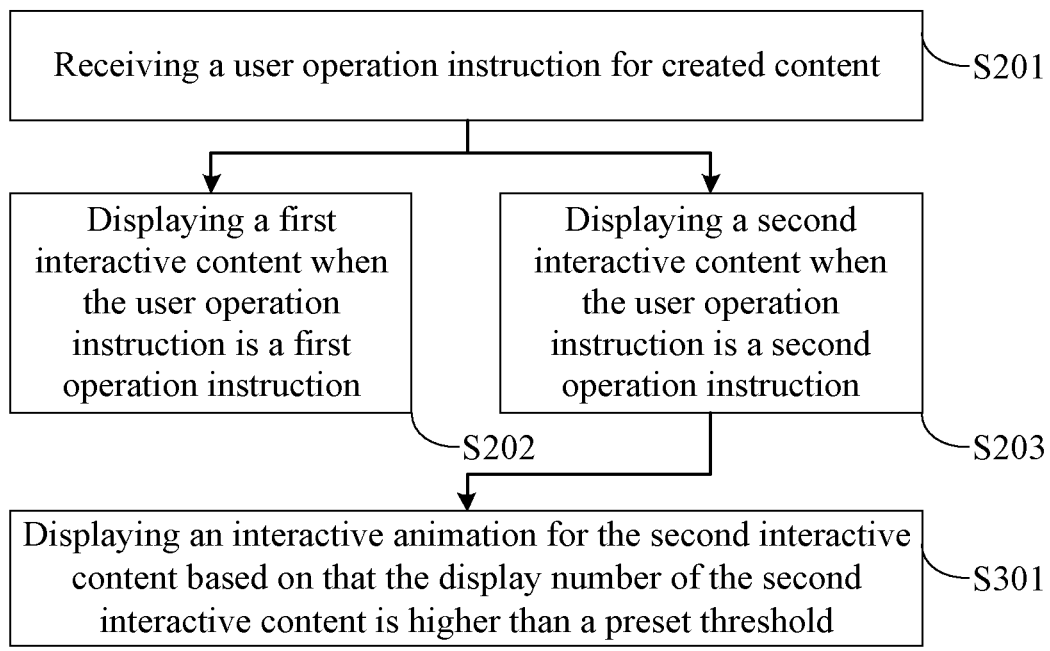
FIG. 3 is a flow chart of another method for displaying interactive content shown according to an exemplary embodiment.

In some embodiments, FIG. 3 shows another embodiment of the method for displaying interactive content on the basis of the embodiment as shown in FIG. 2. As shown in FIG. 3, the method for displaying interactive content may further include:

S301, displaying an interactive animation for the second interactive content based on that the display number of the second interactive content is higher than a preset threshold.

The terminal may acquire the display number of the second interactive content for the created content. In some embodiments, for a certain created content, the terminal may transmit counting data to a background server after displaying the second interactive content, then the background server counts the counting data of the respective terminals to obtain the current display number of the second interactive content for the created content and may transmit the current display number to each terminal. As such, the terminal may display the interactive animation for the second interactive content when the display number is higher than the preset threshold.

In some embodiments, when the above-mentioned second interactive content is a second appreciation sign, such as a super bomb thumb-up, and the display number of the super bomb thumb-up is higher than the preset threshold such as 100, the terminal may display an animation that the super bomb thumb-up explodes. As such, a user can intuitively experience that the created content is popular among many other friends at the same time. In this way, the social interaction attributes are added, and the user experience is further improved.

Of course, the technician may set the above-mentioned threshold according to the actual service requirement, and the specific numerical value is not limited in some embodiments.

According to the method for displaying interactive content provided by the embodiment of the present disclosure, the first interactive content may be displayed when the first operation instruction is received, and the second interactive content may be displayed when the second operation instruction is received. As such, the user may experience different interactions by his different operations, the interaction effect is richer, and the user experience is further improved.

Embodiment 3

Figure 4:
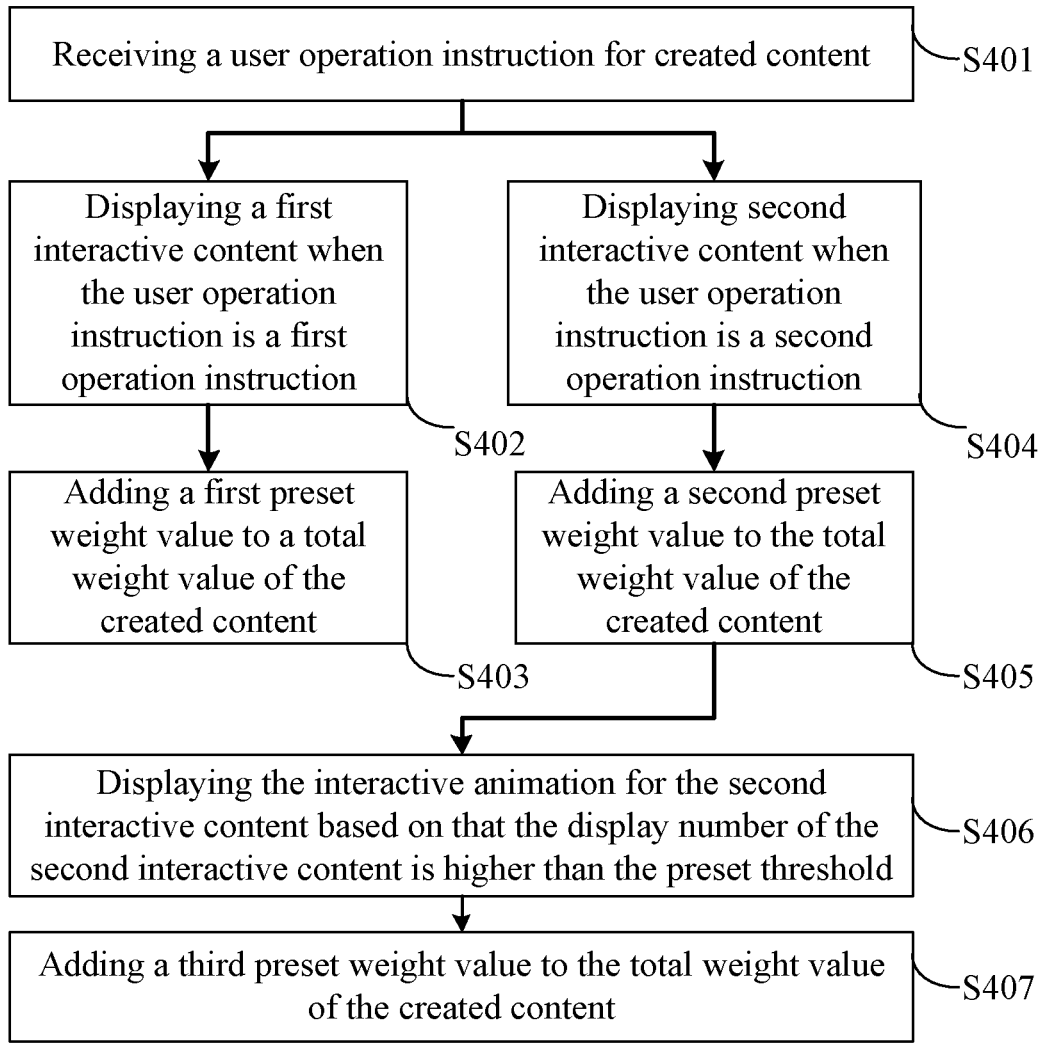
FIG. 4 is a flow chart of a fourth method for displaying interactive content shown according to an exemplary embodiment.

FIG. 4 is a flow chart of a method for displaying interactive content shown according to an exemplary embodiment. As shown in FIG. 4, the method for displaying interactive content is used in a terminal. In some embodiments, the terminal may be a portable computer, an intelligent mobile terminal and the like. The method for displaying interactive content includes the following steps.

S401, receiving a user operation instruction for created content.

The step is same as step S101 in embodiment 1, the descriptions thereof are omitted in some embodiments.

S402, displaying first interactive content when the user operation instruction is a first operation instruction.

The step is same as step S202 in embodiment 2, the descriptions thereof are omitted in the embodiments.

S403, adding a first preset weight value to a total weight value of the created content.

After displaying the first interactive content, the terminal may add the first preset weight value to the total weight value of the created content. In some embodiments, the terminal adds 1 preference score for the created content.

S404, displaying a second interactive content when the user operation instruction is a second operation instruction.

The step is same as step S203 in embodiment 2, the descriptions thereof are omitted in the embodiments.

S405, adding a second preset weight value to the total weight value of the created content, where the second preset weight value is higher than the first preset weight value.

After displaying the second interactive content, the terminal may add the second preset weight value to the total weight value of the created content. In some embodiments, 2 points of preference score are added to the created content. Since the second preset weight value is higher than the first preset weight value, a user may distinguish preference levels for different created contents by setting different weight values. Also, other friends may see the total score of the created content, so that the social attributes of the embodiment of the present disclosure are further improved, and better interaction among users is realized.

S406, displaying the interactive animation for the second interactive content based on that the display number of the second interactive content is higher than the preset threshold.

The step is same as step S301 in embodiment 2, the descriptions thereof are omitted in the embodiments.

S407, adding a third preset weight value to the total weight value of the created content.

After displaying the interactive animation for the second interactive content, the terminal may add the third preset weight value to the total weight value of the created content.

In some embodiments, as discussed above, the background server may count the display number of the second interactive content for certain created content. In some embodiments, the number of super comb appreciation signs marked for the created content, and therefore, the third preset weight value may be calculated by substituting the display number into a preset expression which may be:

$$y = \frac{n}{100}$$

In the expression, y represents for the third preset weight value, and n represents for the display number of the second interactive content.

It may be understood that the total weight value is obtained by successively adding the first preset weight value, the second preset weight value and the third preset weight value. In some embodiments. The terminal may display the created content and the total weight value corresponding to the created content to a target recommended user after obtaining the total weight value corresponding to the created content.

In some embodiments, the terminal may determine a friend set to which a current user who has watched the created content belongs, namely a friends circle of the current user, and determines users in the friend set as the target recommended users so as to recommend the created content to the target recommended users. In some embodiments, the created content or a preview of the created content is displayed, and the total weight value, namely total score, of the created content is displayed to attract the watching interests of other users, so that social attributes of the embodiments of the present disclosure are further improved, and better interaction among the users is realized.

By using the method for displaying interactive content provided by the embodiment of the present disclosure, different weight values may be added to the created content based on the different interactive contents displayed by the terminal, namely a corresponding preference score is added for the created content. As such, other users may know the popularity degree of the created content, the social attributes of the embodiments of the present disclosure are further improved, and better interaction among the users is realized.

Figure 5:
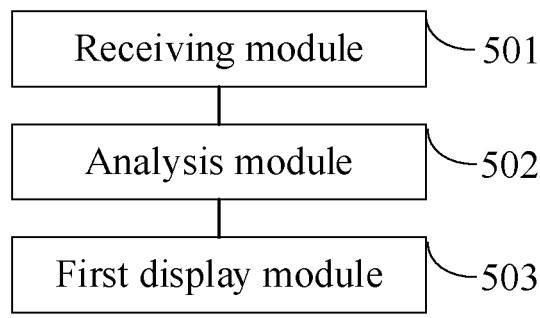
FIG. 5 is a block diagram of an interactive content display device shown according to an exemplary embodiment.

FIG. 5 is a block diagram of an interactive content display device shown according to an exemplary embodiment. Referring to FIG. 5, the device includes:

a receiving module 501 configured to receive a user operation instruction for created content;

an analysis module 502 configured to analyze the user operation instruction and determine interactive content corresponding to the user operation instruction; and a first display module 503 configured to display the interactive content, where the interactive content is used for indicating a preference level of a user to the created content.

In some embodiments, the first display module is configured to:

display first interactive content when the user operation instruction is a first operation instruction; and display second interactive content when the user operation instruction is a second operation instruction, where the first operation instruction is different from the second operation instruction, and the user preference level indicated by the second interactive content is higher than that indicated by the first interactive content.

Figure 6:
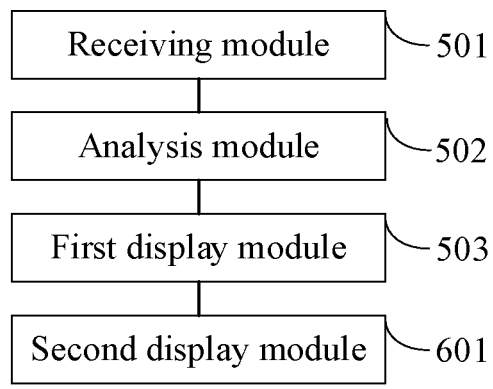
FIG. 6 is a block diagram of another interactive content display device shown according to an exemplary embodiment.

In some embodiments, FIG. 6 shows another embodiment of the device on the basis of the structure of the device as shown in FIG. 5. As shown in FIG. 6, the device may further include:

a second display module 601 configured to display an interactive animation for the second interactive content based on that the display number of the second interactive content is higher than a preset threshold.

Figure 7:
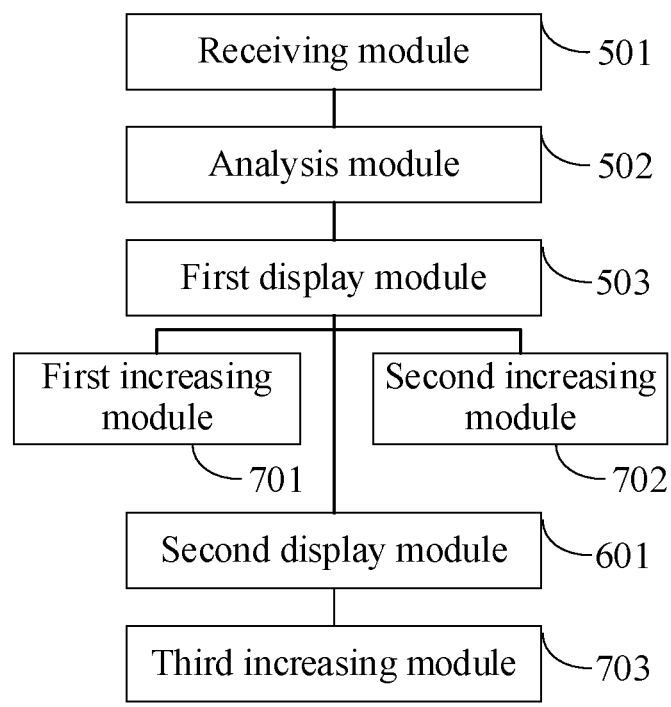
FIG. 7 is a block diagram of another interactive content display device shown according to an exemplary embodiment.

In some embodiments, FIG. 7 shows another embodiment of the device on the basis of the structure of the device as shown in FIG. 6. As shown in FIG. 7, the device may further include:

a first adding module 701 configured to add a first preset weight value to a total weight value of the created content;

a second adding module 702 configured to add a second preset weight value to the total weight value of the created content, where the second preset weight value is higher than the first preset weight value; and a third adding module 703 configured to add a third preset weight value to the total weight value of the created content, where the third preset weight value is determined according to a display number of the second interactive content.

Figure 8:
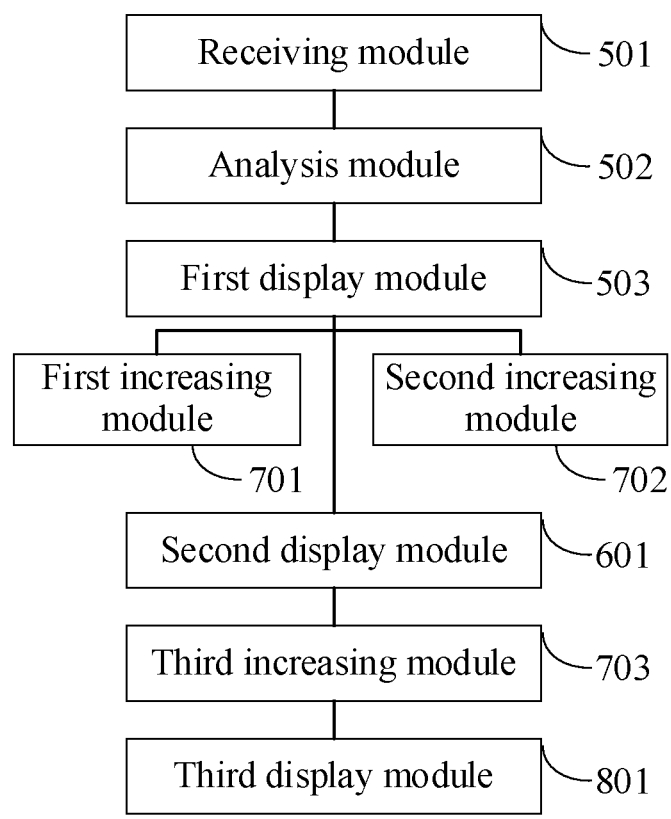
FIG. 8 is a block diagram of a fourth interactive content display device shown according to an exemplary embodiment.

In some embodiments, FIG. 8 shows another embodiment of the device on the basis of the structure of the device as shown in FIG. 7. As shown in FIG. 8, the device may further include:

a third display module 801 configured to display the created content and the total weight value to a target recommended user, where the total weight value is generated based on the first preset weight value, the second preset weight value and the third preset weight value.

According to the interactive content display device provided by the embodiment of the present disclosure, after the user operation instruction for the created content is received, the user operation instruction is analyzed, and the interactive content corresponding to the user operation instruction is determined, so that the determined interactive content is displayed. Since the interactive content indicates a preference level of a user to the created content, the interactive content may be displayed in a more abundant display way, so that the user experience is improved.

With respect to the device in the above-mentioned embodiments, a way that each of the modules executes the operation has been described in detail in the embodiment of the method so as not to be described in detail herein.

Figure 9:
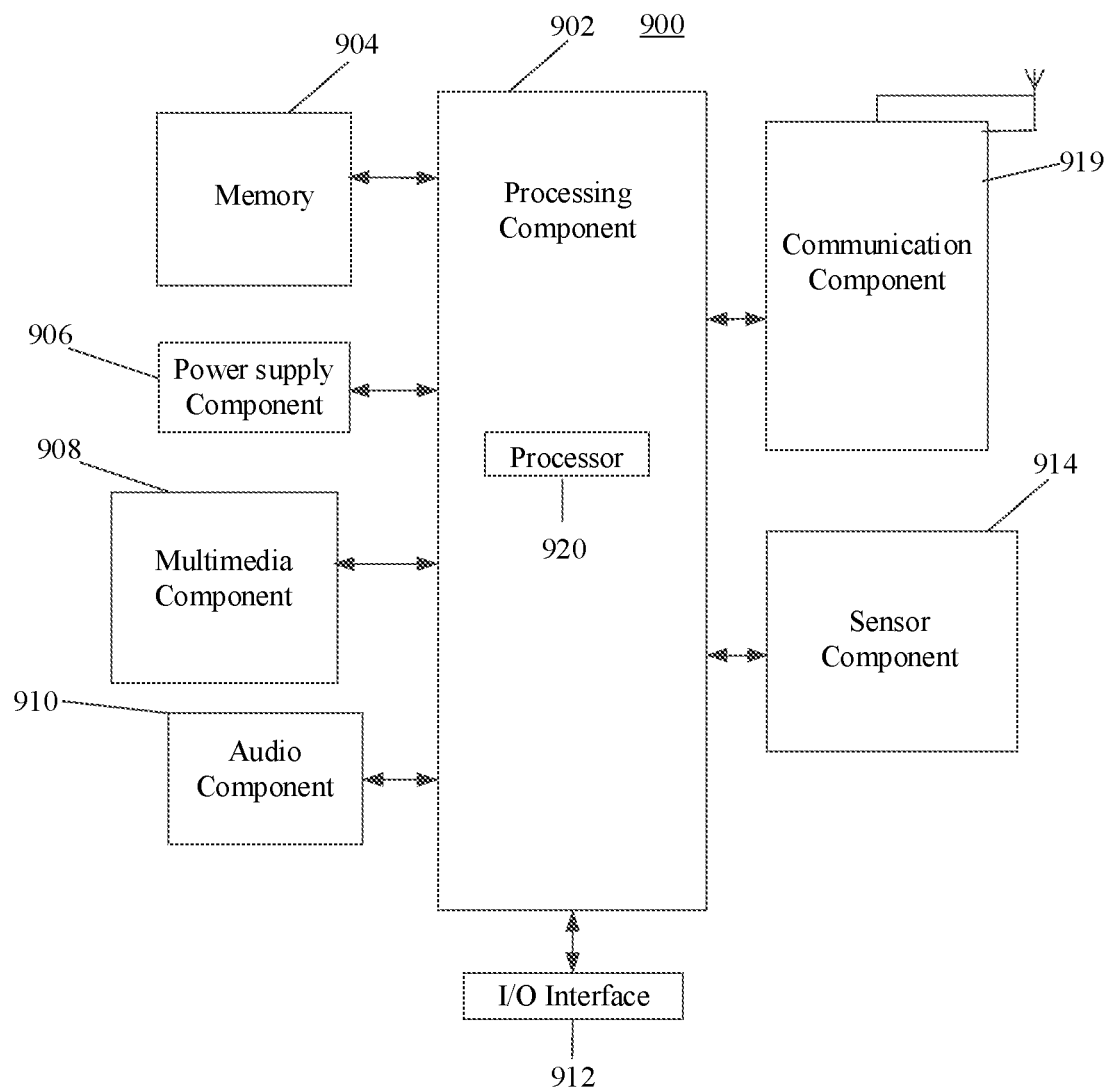
FIG. 9 is a block diagram of a device shown according to an exemplary embodiment.

FIG. 9 is a block diagram of a device 900 for interactive content display shown according to an exemplary embodiment. In some embodiments, the device 900 may be a mobile phone, a computer, a digital broadcasting terminal, a message sending and receiving device, a game console, tablet equipment, medical equipment, fitness equipment, a personal digital assistant and the like.

Referring to FIG. 9, the device 900 may include one or more of the following components: a processing component 902, a memory 904, a power supply component 906, a multimedia component 908, an audio component 910, an input/output (I/O) interface 912, a sensor component 914 and a communication component 916.

The processing component 902 generally controls the overall operation of the device 900, such as operations associated with display, telephone calling, data communication, camera operation and recording operation. The processing component 902 may include one or more processors 920 to execute an instruction so as to complete all or parts of steps of the above-mentioned method. In addition, the processing component 902 may include one or more modules facilitating the interaction between the processing component 902 and each of other components. In some embodiments, the processing component 902 may include a multimedia module so as to facilitate the interaction between the multimedia component 908 and the processing component 902.

The memory 904 is configured to store various types of data so as to support the operations on the device 900. An example of the data includes an instruction for operating any programs or methods on the device 900, contact data, telephone directory data, messages, pictures, videos and the like. The memory 904 may be realized by any types of volatile or non-volatile storage devices or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disc.

The power supply component 906 provides power for various components of the device 900. The power supply component 906 may include a power supply management system, one or more power sources and other components associated with the generation, management and power distribution of the device 900.

The multimedia component 908 includes a screen located between the device 900 and a user and provided with an output interface. In some embodiments, the screen may include a liquid crystal display (LCD) and a touch panel (TP). If the screen includes the TP, the screen may be realized as a touch screen so as to receive an input signal from a user. The TP includes one or more touch sensors so as to sense touch, slide and gestures on the TP. The touch sensor not only may sense the boundary of a touch or slide operation, but also may detect duration time and pressure related to the touch or slide operation. In some embodiments, the multimedia component 908 includes a front camera and/or a rear camera. When the equipment 900 is in an operating mode such as a shooting mode or a video mode, the front camera and/or a rear camera may receive external multimedia data. Each of the front camera and the rear camera may be a fixed optical lens system or may have focal length and optical zooming capability.

The audio component 910 is configured to output and/or input an audio signal. In some embodiments, the audio component 910 includes a microphone (MIC), when the device 900 is in the operating mode such as a calling mode, a recording mode and a voice recognition mode, the MIC is configured to receive an external audio signal. The received audio signal may be further stored in the memory 904 and may be transmitted by the communication component 916.

In some embodiments, the audio component 910 further includes a loudspeaker for outputting an audio signal.

The I/O interface 912 is provided between the processing component 902 and a peripheral interface module, the above-mentioned peripheral interface module may be a keyboard, a click wheel, buttons and the like. These buttons may include, but are not limited to a homepage button, a volume button, a start button and a lock button.

The sensor component 914 includes one or more sensors for providing state evaluation on various aspects for the interactive content display device 900. In some embodiments, the sensor component 914 may detect a starting/stopping state of the equipment 900 and the relative positioning of the components. In some embodiments, the component is used as a display and a keypad of the device 900, and the sensor component 914 may also detect the position change of the device 900 or one component of the device 900, the existence or inexistence of contact between a user and the device 900, the orientation or acceleration/deceleration of the device 900 and the temperature variation of the device 900. The sensor component 914 may include a proximity sensor configured to detect the existence of a nearby object when no any physical contacts exist. The sensor component 914 may further include an optical sensor such as a CMOS or CCD image sensor used in imaging applications. In some embodiments, the sensor component 914 may further include an acceleration sensor, a gyroscope sensor, a magnetic sensor, a pressure sensor or a temperature sensor.

The communication component 916 is configured to facilitate the communication between the device 900 and any equipment in a wired or wireless way. The device 900 may be accessed to a wireless network based on a communication standard, such as a WiFi, an operator network (such as 2G, 3G, 4G or 5G) or a combination thereof. In an exemplary embodiment, the communication component 916 receives a broadcast signal or broadcast related information from an external broadcast management system through a broadcast channel. In one exemplary embodiment, the communication component 916 further includes a near-field communication (NFC) module so as to facilitate short-range communication. In some embodiments, the NFC module may be realized based on a radio frequency identification (RFID) technology, an infrared data association (IrDA) technology, an ultrawide band (UWB) technology, a Bluetooth (BT) technology and other technologies.

In an exemplary embodiment, the device 900 may be realized by one or more application specific integrated circuits (ASIC), a digital signal processor (DSP), a digital signal processing device (DSPD), a programmable logic device (PLD), a field-programmable gate array (FPGA), a controller, a microcontroller, a microprocessor or other electronic elements and is used for executing the above-mentioned method for displaying interactive content.

In an exemplary embodiment, further provided is a non-transient computer readable storage medium including an instruction, such as a memory 904 including an instruction, the above-mentioned instruction may be executed by the processor 920 of the device 900 so as to perform the method according to any one of the embodiments above. In some embodiments, the non-transient computer readable storage medium may be an ROM, a random access memory (RAM), a CD-ROM, a magnetic tape, a floppy disk, optical data storage equipment and the like.

In an exemplary embodiment, further provided is a computer program product, when executed by a computer, cause the computer to perform the method according to any one of the embodiments above.

The skilled in the art will readily envision other implementation solutions of the present disclosure after taking the specification into account and practicing the disclosure disclosed herein. The present disclosure is intended to include any variations, applications or adaptive changes of the present disclosure, and these variations, applications or adaptive changes conform to the general principle of the present disclosure and include common general knowledge or conventional technical means in the technical field undisclosed in the present disclosure. The specification and the embodiments are only regarded to be exemplary, and the true scope and spirit of the present disclosure are only indicated by the appended claims.

It should be understood that the present disclosure is not limited to a precise structure which has been described above and shown in the accompanying drawings, and various modifications and alterations may be made without departing from the scope of the present disclosure. The scope of the present disclosure is only limited by the appended claims.

The invention claimed is:

1. A method for displaying interactive content, comprising:

receiving a user operation instruction for created content;
analyzing the user operation instruction;
determining interactive content corresponding to the user operation instruction; and
displaying the interactive content, wherein the interactive content is used for indicating preference level of a user to the created content, and different interactive contents indicate different preference levels;
wherein said displaying the interactive content comprises:
displaying first interactive content when the user operation instruction is a first operation instruction; and
displaying second interactive content when the user operation instruction is a second operation instruction;
wherein the first operation instruction is different from the second operation instruction, and a preference level indicated by the second interactive content is higher than a preference level indicated by the first interactive content;
wherein the method further comprises:
adding a first preset weight value to a total weight value of the created content after displaying the first interactive content;
adding a second preset weight value to the total weight value of the created content after displaying the second interactive content, wherein the second preset weight value is higher than the first preset weight value; and
adding a third preset weight value to the total weight value of the created content after displaying the interactive animation for the second interactive content, wherein the third preset weight value is determined according to a display frequency of the second interactive content.

2. The method according to claim 1, further comprising:
displaying an interactive animation for the second interactive content based on that the display quantity of the second interactive content is higher than a preset threshold.

3. The method according to claim 1, further comprising:
displaying the created content and the total weight value to target recommended users, wherein the total weight value is generated based on the first preset weight value, the second preset weight value and the third preset weight value.

4. An electronic device, comprising:
a processor; and
a memory configured to store processor executable instructions;
wherein the processor is configured to execute the instructions to perform:
receiving a user operation instruction for created content;
analyzing the user operation instruction;
determining interactive content corresponding to the user operation instruction; and
displaying the interactive content, wherein the interactive content is used for indicating preference level of a user to the created content, and different interactive contents indicate different preference levels;
wherein said that displaying the interactive content comprises:
displaying first interactive content when the user operation instruction is a first operation instruction; and
displaying second interactive content when the user operation instruction is a second operation instruction;
wherein the first operation instruction is different from the second operation instruction, and a preference level indicated by the second interactive content is higher than a preference level indicated by the first interactive content;
wherein the processor is further configured to execute the instructions to perform:
adding a first preset weight value to a total weight value of the created content after displaying the first interactive content;
adding a second preset weight value to the total weight value of the created content after displaying the second interactive content, wherein the second preset weight value is higher than the first preset weight value; and
adding a third preset weight value to the total weight value of the created content after displaying the interactive animation for the second interactive content, wherein the third preset weight value is determined according to a display frequency of the second interactive content.

5. The electronic device according to claim 4, wherein the processor is further configured to execute the instructions to perform:
displaying an interactive animation for the second interactive content based on that the display quantity of the second interactive content is higher than a preset threshold.

6. The electronic device according to claim 4, wherein the processor is further configured to execute the instructions to perform:
displaying the created content and the total weight value to target recommended users, wherein the total weight value is generated based on the first preset weight value, the second preset weight value and the third preset weight value.

7. A non-transitory computer readable storage medium, storing instructions executable by processors of an electronic device, wherein the instructions are executed by the processors to enable the electronic device to perform:
receiving a user operation instruction for created content;
analyzing the user operation instruction;
determining interactive content corresponding to the user operation instruction; and
displaying the interactive content, wherein the interactive content is used for indicating preference level of a user to the created content, and different interactive contents indicate different preference levels;
wherein said that displaying the interactive content comprises:
displaying first interactive content when the user operation instruction is a first operation instruction; and
displaying second interactive content when the user operation instruction is a second operation instruction;
wherein the first operation instruction is different from the second operation instruction, and a preference level indicated by the second interactive content is higher than a preference level indicated by the first interactive content;
wherein the instructions are executed by the processors to further enable the electronic device to perform:
adding a first preset weight value to a total weight value of the created content after displaying the first interactive content;
adding a second preset weight value to the total weight value of the created content after displaying the second interactive content, wherein the second preset weight value is higher than the first preset weight value; and
adding a third preset weight value to the total weight value of the created content after displaying the interactive animation for the second interactive content, wherein the third preset weight value is determined according to a display frequency of the second interactive content.

8. The non-transitory computer readable storage medium according to claim 7, wherein the instructions are executed by the processors to further enable the electronic device to perform:
displaying an interactive animation for the second interactive content based on that the display quantity of the second interactive content is higher than a preset threshold.

9. The non-transitory computer readable storage medium according to claim 7, wherein the instructions are executed by the processors to further enable the electronic device to perform:
displaying the created content and the total weight value to target recommended users, wherein the total weight value is generated based on the first preset weight value, the second preset weight value and the third preset weight value.

* * * * *